(12) United States Patent
Bender

(10) Patent No.: US 8,291,846 B2
(45) Date of Patent: Oct. 23, 2012

(54) BOAT MOORING ASSEMBLY

(76) Inventor: Scott Bender, Sanibel, FL (US)

( * ) Notice: Subject to any disclaimer, the term of this patent is extended or adjusted under 35 U.S.C. 154(b) by 145 days.

(21) Appl. No.: 12/856,610

(22) Filed: Aug. 14, 2010

(65) Prior Publication Data

US 2012/0037061 A1  Feb. 16, 2012

(51) Int. Cl.
*B63B 59/02* (2006.01)
(52) U.S. Cl. .................................. 114/219; 114/230.27
(58) Field of Classification Search ................. 114/219, 114/230.22, 230.27, 230.24, 230.13
See application file for complete search history.

(56) References Cited

U.S. PATENT DOCUMENTS

| | | | | |
|---|---|---|---|---|
| 2,381,665 | A * | 8/1945 | Higgins, Jr. .................. | 114/219 |
| 3,462,960 | A * | 8/1969 | Bruehl .......................... | 405/214 |
| 3,464,214 | A * | 9/1969 | King ............................. | 405/214 |
| 3,564,858 | A * | 2/1971 | Pogonowski ................. | 405/212 |
| 3,842,779 | A * | 10/1974 | Jaynes ..................... | 114/230.24 |
| 7,322,307 | B1 * | 1/2008 | Perry ............................. | 114/219 |

* cited by examiner

*Primary Examiner* — Stephen Avila
(74) *Attorney, Agent, or Firm* — Renner, Otto, Boisselle & Sklar, LLP

(57) ABSTRACT

Described is a boat mooring assembly and method for preventing a boat from being damaged during docking and mooring. The boat mooring assembly can be used to moor a boat while allowing the boat to adjust to rising and falling tides. The latter advantage is of particular benefit when a boat is being moored in bodies of water that experience large tidal changes.

17 Claims, 3 Drawing Sheets

BOAT MOORING ASSEMBLY

The present invention relates generally to boat mooring, and more particularly to a floating boat mooring assembly.

BACKGROUND

Boat mooring assemblies are used by boaters to secure a boat to a dock, piling, etc., to prevent the boat from floating away. To do so, the boat may be moored by ropes, cables, or specially designed fastening devices. The boat mooring assemblies may be designed to allow the boat to move to adjust to changing tides, for example, by leaving slack in the rope attaching the boat to a piling.

SUMMARY OF INVENTION

The present disclosure describes a boat mooring assembly and method for securely mooring a boat and preventing the boat from being damaged during docking and mooring. The boat mooring assembly can be used to moor a boat while allowing the boat to adjust to rising and falling tides. The latter advantage is of particular benefit when a boat is being moored in bodies of water that experience large tidal changes.

The foregoing and other features of the invention are hereinafter described in greater detail with reference to the accompanying drawings.

DETAILED DESCRIPTION

The principles of the present invention have particular application to mooring boats in turbulent waters and areas with large tidal changes. It will of course be appreciated, and also understood, that principles of this invention can be applied to other watercrafts or floatation devices used in waters of varying turbulence and tidal changes.

Figure 1:
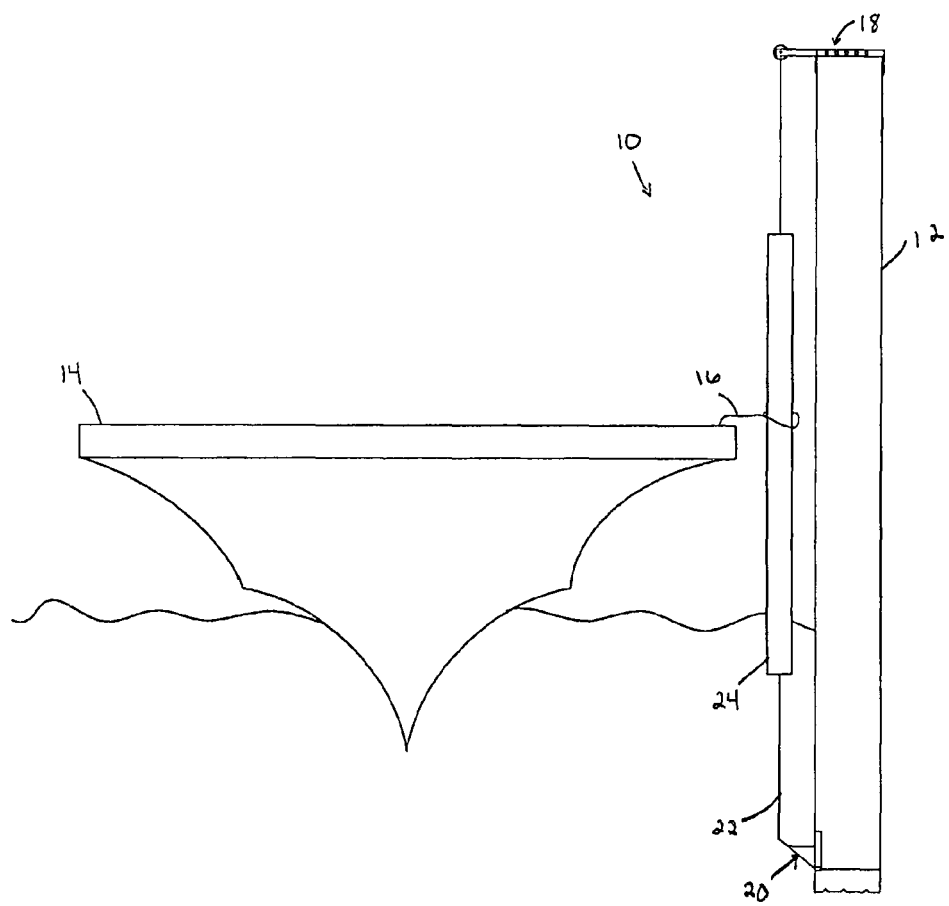
FIG. 1 is an environmental view of an exemplary boat mooring assembly in accordance with the invention.

The principles of the invention will now be described with reference to the drawings. Referring now to FIG. 1, an environmental view of a boat mooring assembly 10 in accordance with the invention is shown. The boat mooring assembly 10 generally includes top and bottom brackets 18 and 20 that are configured to secure first and second ends of a cable 22 to first and second ends of the piling, respectively. Also included is a floating roller 24 that is configured to be disposed over the cable 22 and interposed between the brackets 18 and 20. The boat mooring assembly may be coupled to a structure such as a piling 12, although it will be appreciated that the assembly may be secured to other structures such as docks, buoys, etc. A boat 14 can be secured to the boat mooring assembly by a fastener 16, such as a rope, although it will be appreciated that other fasteners such as wire, chain, plastic cable, etc. may be used to secure the boat to the assembly.

In an exemplary embodiment, at least two boat mooring assemblies may be used, for instance, coupled to pilings that are substantially in parallel with one another, to securely moor both ends of the boat 14 to the at least two pilings. Once the boat 14 has been secured to at least one assembly, the at least one assembly allows the boat to be securely moored, for example on one side of a boat slip to save space, while allowing the boat to move due to turbulent waters and tidal changes.

Figure 2:
FIG. 2 is a perspective view of an exemplary cable.

Referring to FIGS. 2-5, the boat mooring assembly 10 is described in detail. Referring now to FIG. 2, the cable 22 is shown, which can be made of any suitable material capable of being used in the water, for example, stainless steel. The cable 22 is shown including first and second ends 26 and 30, wherein the first end 30 includes an eye 28, such as a loop, that can be integrally formed at the first end 30 of the cable 22 or alternatively can include an eyelet that can be attached to the first end 26 of the cable 22. The eye 28 allows the first end 26 of the cable 22 to be formed in a lasso-like shape around the piling 12, thereby allowing the cable 22 to be positioned around a bottom of the piling. Alternatively, the cable 22 can be wrapped around the piling and fastened to itself using a suitable fastener to position the cable around the bottom of the piling 12. The cable 22 can be held in position at the bottom of the piling 12 by the bottom bracket 20, which acts to space the cable 22 from the piling and to cinch the cable to the piling.

Figure 3:
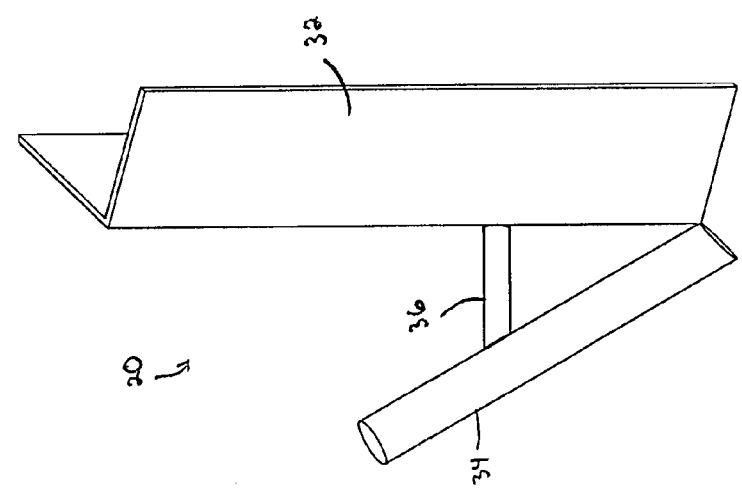
FIG. 3 is a perspective view of a bottom bracket in accordance with the invention.

Referring now to FIG. 3, the bottom bracket 20 is shown in more detail. The bottom bracket includes an L-bracket member 32 and a tubular member 34 that can be coupled to the L-bracket member 32 by any suitable means, such as by welding at bottom portions of the L-bracket member 32 and the tubular member 34. A support member 36 can be provided that is configured to be coupled to both the L-bracket member 32 and the tubular member 34 by any suitable means, such as welding, to further secure the tubular member to the L-bracket member. The various members of the bottom bracket 20 can be made of any suitable material capable of being used in the water, for example, stainless steel.

To install the bottom bracket 20, the second end 30 of the cable 22 can be threaded through the tubular member 34 of the bracket 20, from the bottom of the tubular member to the top. The bracket 20 can then be positioned above the lasso-like first end of the cable 22 and abutting the piling 12 at a corner of the piling via the L-bracket 32 when the lasso-like first end of the cable 22 is in position at the bottom of the piling 12. In this way, the bottom bracket 20 and cable 22 can be positioned and secured without an installer having to enter the water.

Once the bottom bracket 20 has been installed, thereby securing the first end 26 of the cable 22 to the bottom of the piling 12, the second end 30 of the cable can be securely fastened to the top bracket 18, which can be installed either before or after the bottom bracket 20 has been installed. The top bracket 18 can be installed on a top portion of the piling 12, or any other portion of the piling that allows the floating roller 24 to move freely.

Figure 4:
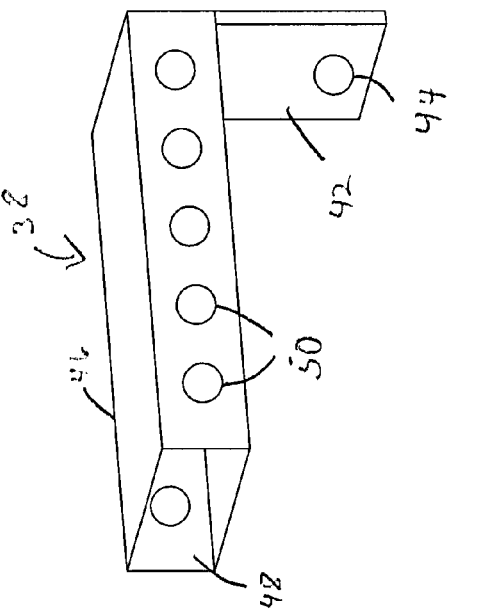
FIG. 4 is a perspective view of a top bracket in accordance with the invention.
Figure 5:
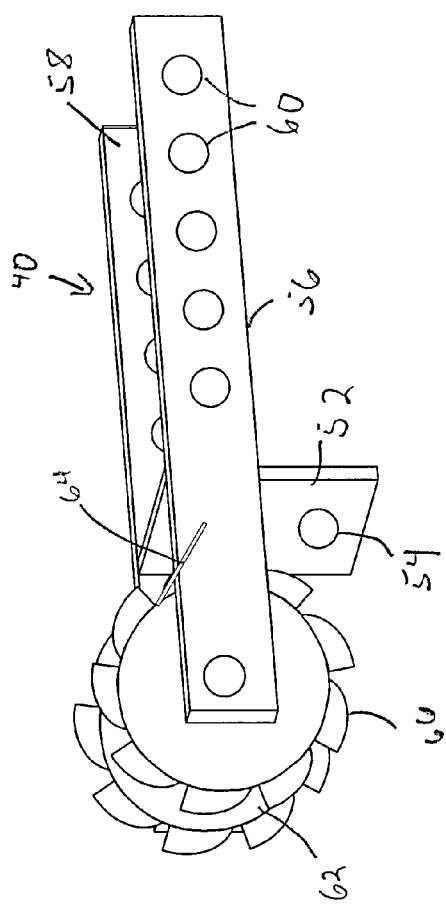
FIG. 5 is a partial top view of the top bracket shown in FIG. 4.
Figure 5:
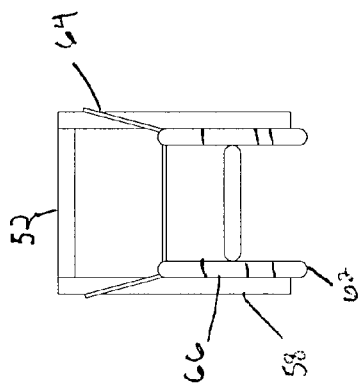

Referring now to FIGS. 4 and 5, the top bracket 18 is shown in detail. The top bracket 18, which can be made of any suitable material such as stainless steel, can include an attachment member 38 and an adjustment member 40 that are configured to be coupled to the piling 12. The attachment member 38 includes a vertical member 42 and a horizontal member 46 that are configured to be coupled together, for example at a rearward portion of the horizontal member and at a top portion of the vertical member, to allow the vertical member to abut a side of the piling and the horizontal member to rest on the top of the piling. The vertical member 42 and the horizontal member 46 can coupled together by any suitable means, such as welding, or alternatively, the vertical member and the horizontal member may be integrally formed.

To couple the attachment member 38 to the piling 12, the vertical member 42 includes a fastener hole 44 for receiving a suitable fastening device, such as a screw, bolt, or nail, which can be advanced into the piling 12. To receive the adjustment member 40, the horizontal member 46 includes a cavity 48 and has a plurality of holes 50 on both sides of the horizontal member 46 for receiving a pin or other suitable device. Alternatively, the attachment member 38 can be sized to be received in between bars 58 of the adjustment member 40.

Referring now to the adjustment member 40 in more detail, the adjustment member 40 includes a vertical member 52 and a horizontal member 56 that are configured to be coupled together by any suitable means, such as welding, or alternatively may be integrally formed. The vertical member 52 includes a fastener hole 54 for receiving a suitable fastening device, such as a screw, bolt, or nail, which can be advanced into the piling 12 to couple the adjustment member 40 to the piling 12.

In an exemplary embodiment, the horizontal member includes bars 58, each having a plurality of holes 60 for receiving a pin or other suitable device. The bars 58 can abut the vertical member 52 on each side of the vertical member and be coupled thereto by any suitable means. Although shown as two pieces, it will be appreciated that the horizontal member 56 can be made of one piece, for example similar to the attachment member 38, and sized to be either larger or smaller than the attachment member 38 to either fit over the attachment member 38 or slide inside the cavity 48 of the attachment member 38.

Also included on the adjustment member 40, on an outer end of the horizontal member 58, is a ratchet device 62 that is configured to receive the second end 30 of the cable 22 and secure the cable to the top bracket 18. The ratchet device is also configured to tighten the cable 22 until the cable has reached a desired tension, at which time a pin 64 can be moved to position across teeth 66, thereby preventing the ratchet from releasing. Should the cable 22 need tensioned further, the ratchet 62 and pin 64 can be adjusted accordingly. The ratchet device 62 can be any suitable ratchet device to allow the cable 22 to be easily tightened, thereby minimizing give in the cable 22. Alternatively, the ratchet device 56 can be replaced by any other suitable means for securing the cable to the bracket, for example, by winding the cable 22 around a spindle and securing the second end 30 of the cable 22 using a suitable fastener.

To install the top bracket 18, the attachment member 38 is abutted against a back side of the piling 12, opposite a front side of the piling that faces the boat 14. The attachment member 38 is coupled to the piling 12 by advancing a fastening device through the fastener hole 44 in the vertical member 42 of the attachment member 38 and then advancing the fastening device into the piling 12. The adjustment member 40 is then secured to the attachment member 38 by inserting the horizontal member 56 of the adjustment member 40 into the cavity 48 in the horizontal member 46 of the attachment member 38.

The adjustment member 40 can then be coupled to the attachment member 38 by inserting at least one fastener, for example a pin, through holes 50 and 60, which are configured to be lined up when the adjustment member 40 is inserted into the attachment member 38. The holes 50 and 60 allow the bracket 18 to be used with pilings of varying sizes by allowing the adjustment member 40 to be adjusted based on the thickness of the piling 12. The adjustment member 40 may then be attached to the front side of the piling 12 by advancing a fastening device through the fastener hole 54 in the vertical member 52 of the adjustment member 40 and then advancing the fastening device into the piling 12.

Figure 6:
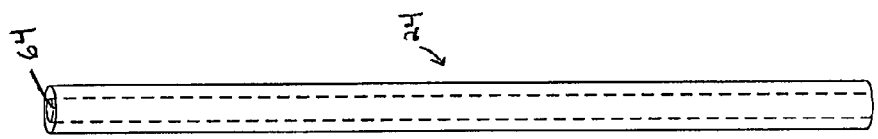
FIG. 6 is perspective view of an exemplary floating roller.

Referring now to FIG. 6, the floating roller 24 is shown in more detail. The roller 24 includes a through hole 64 configured to receive the cable 22, and can be made of any suitable material, such as plastic, to allow the roller 24 to float while also protecting the roller from water damage. In an exemplary embodiment, the roller 24 can be a plastic pipe, for example, a PVC pipe. For added buoyancy, the roller 24 can be lined with a waterproof foam or other suitable material. Alternatively, if the roller it too buoyant, weight can be added to the roller to reach a desired buoyancy.

Once the top and bottom brackets 18 and 20 have been installed, or alternatively prior to the top bracket being installed, the cable 22 can be threaded through the roller 24, and then the second end 30 of the cable 22 can be secured to the top bracket 18. The second end 30 of the cable 22 can be secured to the top bracket by feeding the second end 30 through the ratchet device 62 and ratcheting the device 62 until the cable is at a desired tension.

Upon installation of the mooring assembly 10, the roller 24 will be interposed between the brackets 18 and 20 and be disposed over the cable 22, thereby allowing the roller 24 to adjust its position based on the changes in tide level, turbulence of the water, etc. To moor the boat 14 to the mooring assembly 10, the fastener 16 can be looped around the roller 24 and tied down to the boat 14. As will now be appreciated, the foregoing construction allows the boat 14 to be securely moored in a manner that allows the boat to adjust to the changes in tide level, turbulence of the water, etc., while also allowing the boat to be moored in a manner that saves space in a boat slip, for example by being secured to one side of the boat slip. Still further, the foregoing construction allows the roller 24 to act as a bumper for the boat 14 when the boat moves due to wave action, weather conditions such as wind, etc., thereby preventing the boat 14 from slamming into the piling, dock, etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A boat mooring assembly for mooring a boat to a piling, the assembly including:
   a cable;
   a top bracket configured to secure the cable to a first end of the piling, the top bracket including an attachment member configured to be coupled to the piling and an adjust- ment member configured to be coupled to the attachment member and the piling;

a bottom bracket configured to secure the cable to a second end of the piling, the bottom bracket including an L-bracket member configured to abut the piling and a tubular member configured to receive the cable therethrough; and a floating roller configured to be disposed over the cable and interposed between the top and bottom brackets;

wherein the top bracket is adjustable to pilings of varying sizes; and wherein the bottom bracket is configured to space the cable from the piling.

2. A boat mooring assembly according to claim 1, wherein the cable has a first end having an eye that is configured to receive a second end of the cable to form a lasso-like shape around the piling.

3. A boat mooring assembly according to claim 1, wherein the bottom bracket further includes a support member configured to be coupled to the L-bracket member and the tubular member.

4. A boat mooring assembly according to claim 1, wherein the adjustment member can be adjusted relative to the attachment member to accommodate pilings of varying sizes.

5. A boat mooring assembly according to claim 1, wherein the attachment and adjustment members each include vertical and horizontal members configured to be couple together respectively.

6. A boat mooring assembly according to claim 5, wherein each vertical member includes a fastener hole for receiving a fastening device to couple the attachment and adjustment members to opposite sides of the piling.

7. A boat mooring assembly according to claim 1, wherein the adjustment member includes a ratchet device on an outside end of the adjustment member that is configured to receive and secure a second end of the cable.

8. A boat mooring assembly according to claim 7, wherein the ratchet device is configured to tighten the cable to a desired tension.

9. A boat mooring assembly according to claim 1, wherein the roller is lined with foam to provide additional buoyancy.

10. A method of installing the boat mooring assembly of claim 1, the method comprising:

securing a first end of the cable to a first end of the piling via the bottom bracket;

running the cable through the floating roller; and securing the second end of the cable to a second end of the piling via the top bracket.

11. A method of installing a boat mooring assembly including a cable, top and bottom brackets configured to secure the cable to first and second ends of the piling, and a floating roller configured to be disposed over the cable and interposed between the top and bottom brackets, wherein the top bracket is adjustable to pilings of varying sizes, and wherein the bottom bracket is configured to space the cable from the piling, the method comprising:

securing a first end of the cable to a first end of the piling via the bottom bracket;

running the cable through the floating roller; and securing the second end of the cable to a second end of the piling via the top bracket;

and wherein securing a first end of the cable further comprises:

forming the first end of the cable in a lasso-like shape around the first end of the piling;

installing the bottom bracket over the lasso-like shape and abutting the piling; and running the cable through a tubular member of the bottom bracket to space the cable from the piling.

12. A method according to claim 11, wherein the first end of the cable has an eye that is configured to receive the second end of the cable to form the lasso-like shape around the piling.

13. A method according to claim 10, wherein securing the second end of the cable further comprises:

attaching the top bracket to the piling;

securing the second end of the cable to the top bracket; and tightening the cable using a ratchet device disposed on an outside end of the top bracket.

14. A method according to claim 13, wherein the top bracket includes an attachment member configured to be coupled to the piling and an adjustment member configured to be coupled to the attachment member and the piling.

15. A method according to claim 14, wherein attaching the top bracket to the piling further comprises:

coupling the attachment member to the piling by advancing a fastening device through a fastener hole on the attachment member and into the piling; and coupling the adjustment member to the piling by advancing a fastening device through a fastener hole on the attachment member and into the piling.

16. A method according to claim 14, wherein the adjustment member can be adjusted relative to the attachment member to accommodate pilings of varying sizes.

17. A method according to claim 10, wherein the roller is lined with foam to provide additional buoyancy.

* * * * *